United States Patent [19]

Shallenberger et al.

[11] 4,081,086
[45] Mar. 28, 1978

[54] HANDLING APPARATUS FOR A NUCLEAR REACTOR FUEL ASSEMBLY

[75] Inventors: John M. Shallenberger, Pittsburgh; Leonard P. Hornak, Irwin; Walter E. Desmarchais, Monroeville, all of Pa.

[73] Assignee: Westinghouse Electric Corporation, Pittsburgh, Pa.

[21] Appl. No.: 440,105

[22] Filed: Feb. 6, 1974

[51] Int. Cl.² .................................... G21C 19/32
[52] U.S. Cl. ........................................ 214/2; 176/30; 214/18 N; 214/658
[58] Field of Search ............. 214/658, 18 N, 2; 176/30

[56] References Cited

U.S. PATENT DOCUMENTS

| | | | |
|---|---|---|---|
| 2,809,157 | 10/1957 | Metcalf | 176/30 X |
| 3,040,911 | 6/1962 | Turner | 214/658 X |
| 3,137,397 | 6/1964 | Nicoll | 214/17 B X |
| 3,344,033 | 9/1967 | Costes | 214/18 N X |
| 3,629,062 | 12/1971 | Mucenchow | 214/18 N X |
| 3,792,787 | 2/1974 | Maloney | 214/2 X |

Primary Examiner—Robert J. Spar
Assistant Examiner—George F. Abraham
Attorney, Agent, or Firm—D. C. Abeles; Z. L. Dermer

[57] ABSTRACT

Apparatus is disclosed for handling radioactive fuel assembly during transfer operations. The radioactive fuel assembly is drawn up into a shielding sleeve which substantially reduces the level of radioactivity immediately surrounding the sleeve thereby permitting direct acess by operating personnel. The lifting assembly which draws the fuel assembly up within the shielding sleeve is mounted to and forms an integral part of the handling apparatus. The shielding sleeve accompanies the fuel assembly during all of the transfer operations.

7 Claims, 3 Drawing Figures

HANDLING APPARATUS FOR A NUCLEAR REACTOR FUEL ASSEMBLY

CROSS REFERENCE TO RELATED APPLICATIONS

This application is related to our copending patent application having the Ser. No. 440,104, now U.S. Pat. No. 3,914,613, filed concurrently herewith and entitled "Inspection And Repair Apparatus For a Nuclear Reactor Fuel Assembly".

BACKGROUND OF THE INVENTION

1. Field of the Invention

This invention pertains to nuclear reactor handling apparatus and more particularly to an arrangement for handling a radioactive fuel assembly during dry transfer operations at a reactor site.

2. Description of the Prior Art

In today's commercial nuclear power plants, there exists a requirement to replace the nuclear core at predetermined time intervals, usually on the order of once every year. This involves removal of irradiated fuel assemblies from the core which is located within a reactor vessel, and after an appropriate period of storage in a spent fuel pit, transferring the fuel assemblies from the storage pile into a shipping cask. Since the cask is designed to function additionally as a radiation shield, the cask may be handled with complete safety and without the need for specialized radiation protection equipment. The shipping cask with the irradiated fuel assembly contained within it is sealed and then loaded a truck and shipped off the nuclear reactor site. It is to be noted, that throughout these transfer operations, the irradiated fuel assembly is shielded at all times. The operations whereby the fuel assembly is removed the core and transferred into the shipping cask are all performed underwater which serves as a radiation shield; thereafter, the shipping cask itself serves as a radiation shield.

In the prior art, replacement of the spent fuel assemblies by new fuel assemblies did not usually require the above mentioned radiation protection procedures. This was because new fuel assemblies such as those utilized in boiling water reactors or pressurized water reactors contain enriched uranium oxide which is not radioactive. Therefore, in the prior art, new fuel elements were brought onto the reactor site by truck or rail, were removed therefrom by a crane and then transferred to a new fuel storage pit without being shielded during these operations.

With the increasing availability of fissile Plutonium 239, which is produced as a by-product within water moderated nuclear reactors, and the inherent economic advantages offered by the use of this nuclear fuel, it is certain that new fuel assemblies will contain significant amounts of recycled Plutonium 239. Since this material is highly radioactive in its "natural state," the prior art handling techniques for a new fuel assembly is no longer satisfactory. That is, that all handling operations for new fuel assemblies containing Plutonium 239 must be performed with the fuel assembly being adequately shielded to prevent site personnel from being exposed to highly dangerous radioactivity.

SUMMARY OF THE INVENTION

The aforementioned inadequacies of the prior art are overcome by the present invention which provides apparatus whereby a new but radioactive fuel assembly is shielded during dry transfer operations.

The invention provides a shielding sleeve having grasping and hoisting capabilities integrally associated therewith. In a preferred embodiment, the shielding sleeve comprises an inner sleeve and an outer sleeve with an annulus therebetween filled with radiation shielding material such as water or mineral oil. The length of the shielding sleeve is slightly greater than the length of the fuel assembly to be transferred so that upon being drawn within the shielding sleeve, the radiation level surrounding the outside of the shielding sleeve is low enough to permit direct access by personnel.

The hoisting capability is provided by a conventional gear motor in cooperation with a cable winch to which wire cable is attached. A fuel grasping tool is attached to the free end of the cable; the fuel grasping tool being mounted to operate within the hollow portion of the shielding sleeve. The shielding sleeve may be provided with one or more access plugs to allow for direct access to the fuel grasping tool or the fuel assembly.

In operation, the shielding sleeve is positioned directly above a fuel assembly which is to be transferred in the air environment of a fuel handling building. Connection is made between the fuel grasping tool and the fuel assembly by utilization of the access port in the shielding sleeve. The gear motor is then activated which rotates the cable winch and lifts the fuel assembly up within the shielding sleeve. The fuel assembly is then pinned to the shielding sleeve by a safety shaft so that the fuel assembly is redundantly supported within the shielding sleeve. At this point the shielding sleeve may be attached to a crane and the entire assembly may be dry transferred, that is, not underwater, to another location in complete safety.

BRIEF DESCRIPTION OF THE DRAWINGS

Other advantages of the invention will be apparent from the following detailed description, taken in consideration with the accompanying drawings, in which.

DESCRIPTION OF THE PREFERRED EMBODIMENTS

Figure 1:
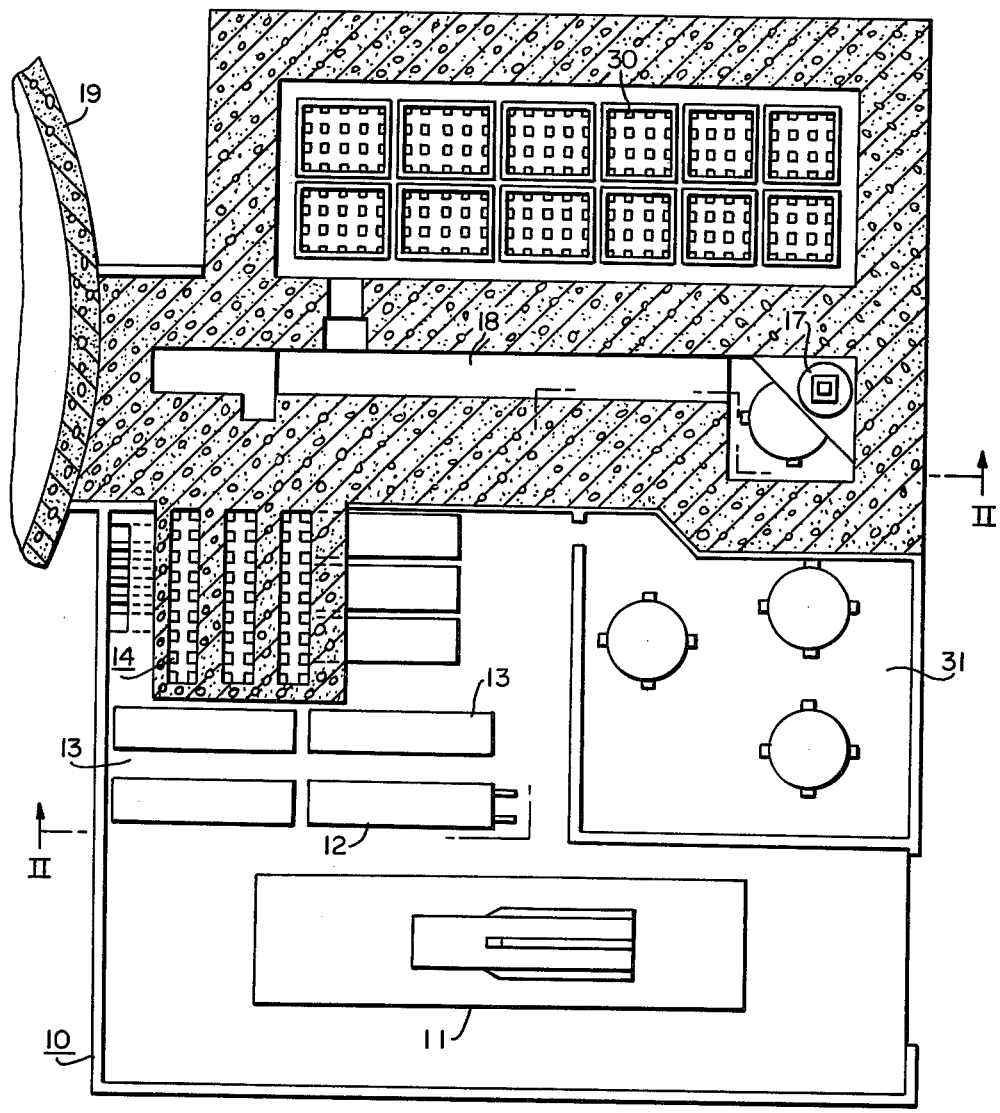
FIG. 1 is a floor plan of a fuel handling building of a nuclear reactor power plant wherein the apparatus as provided by this invention may be utilized.

Throughout the description which follows, like reference characters indicate like elements in the various figures of the drawings.

Figure 2:
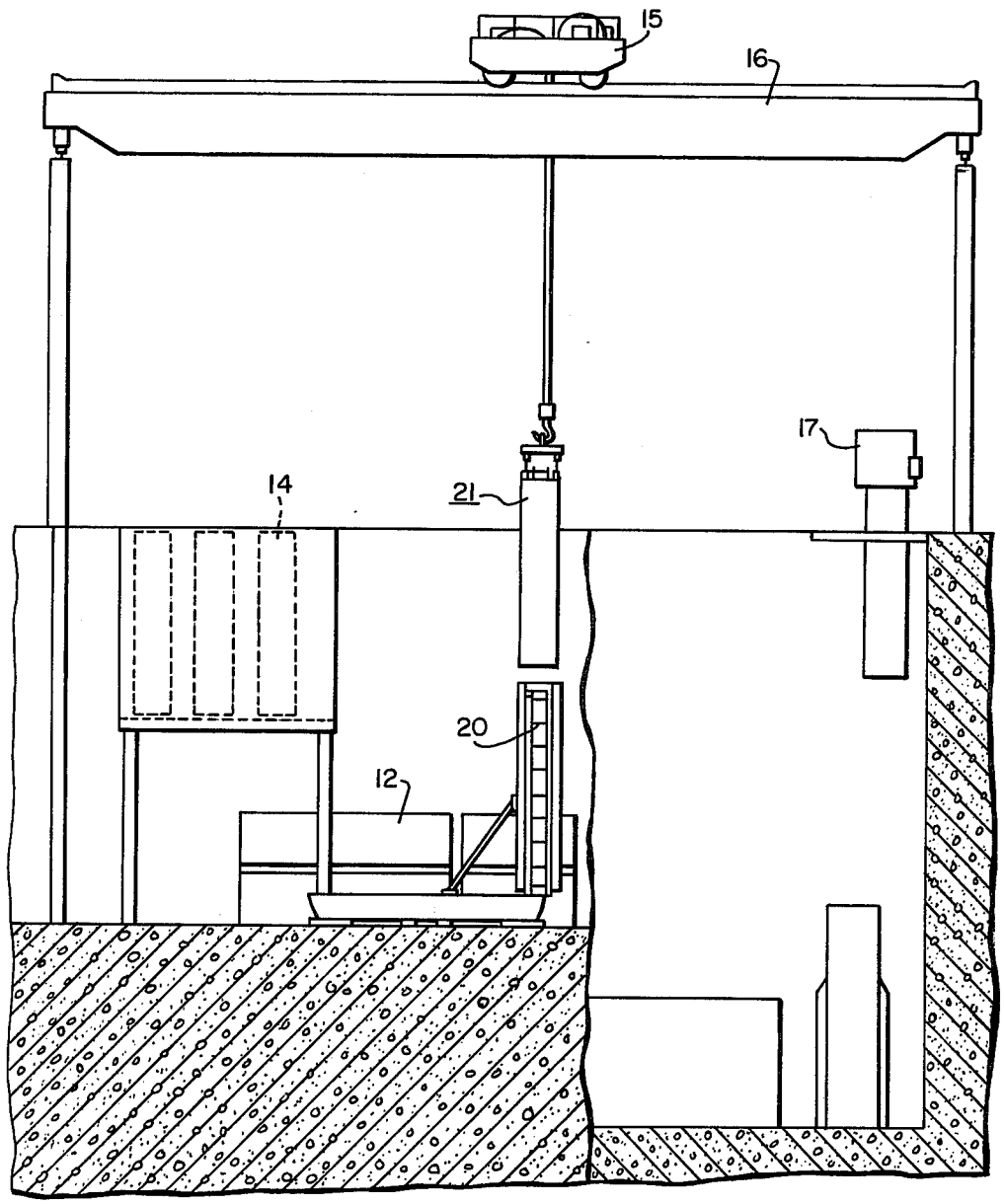
FIG. 2 is a sectional view of the building of FIG. 1 taken substantially along the line II—II.

The building arrangement depicted in FIGS. 1 and 2 is intended to be typical of the many possible building arrangements which allow for fuel transfer operations at a reactor side. These fuel transfer operations fall within two broad categories. The first category consists of transferring new fuel assemblies from rail cars or trucks to on-site storage areas located within a fuel handling building. The second broad category consists of transferring used or spent fuel assemblies from a spent fuel storage area onto a truck or rail car. Although this specification will be primarily concerned with the former category or the transfer of new fuel assemblies, the invention is not to be thereby limited. Modifications of the apparatus provided herein will be readily apparent to one skilled in the art in the utilization of this invention for the transfer of used radioactive fuel assemblies.

New plutonium recycle fuel assemblies which are highly radioactive, may be brought into a fuel handling building 10 by either rail or truck. Unloading of the vehicle is accomplished at an unloading area 11. Typically, new fuel assemblies will be contained within shipping containers which serve as a radiation shield and prevent the release of highly dangerous radioactivity during transit. The shipping containers 12 are removed from the transport vehicle by an overhead crane 15 which suitably supported on a track or rail 16 which is attached to the fuel handling building 10. The shipping containers are then placed in an area 13 adapted for storage of the shipping containers 12.

The fuel assemblies 20 are up-ended along with a portion of the shipping container in a manner as shown in FIG. 2. Although not at all times essential it is preferable that the up ended portion of the shipping container provides for radiation shielding during this phase of the transfer operation. The fuel assembly is then drawn up within the fuel handling arrangement 21 which is suspended from overhead crane 15 and moved to a new fuel storage area 14. New fuel storage area 14 may be made from concrete and filled with water to provide adequate shielding. Up to this point all the fuel handling and transfer operations are accomplished dry, that is, not underwater. Hence, radiation shielding is provided respectively by shipping container 12, the fuel handling arrangement 21, and the new fuel storage area 14.

Still referring to FIGS. 1 and 2, the new plutonium recycle fuel is then transferred from the new fuel storage area 14 to an inspection station 17 and then to a refueling canal 18 in preparation for reloading a core (now shown) of a nuclear reactor (not shown) located in reactor containment building 19. During transfer of the fuel from the new fuel storage area 14 to the refueling canal 18 and while located at the inspection station, radiation shielding is provided by the fuel handling arrangement 21. As with the prior transfer operations within the fuel handling building 10, these are also accomplished dry which permits direct access by reactor site personnel without the danger of radioactive exposure.

As shown in FIG. 1, a spent fuel storage area 30 is operatively connected to the refueling canal 18. Also, a spent fuel shipping cask storage area 31 is located adjacent the unloading area 11. Hence, the fuel handling arrangement 21 provided by this invention may be readily adaptable for the transfer operations of spent fuel which is also highly radioactive.

Figure 3:
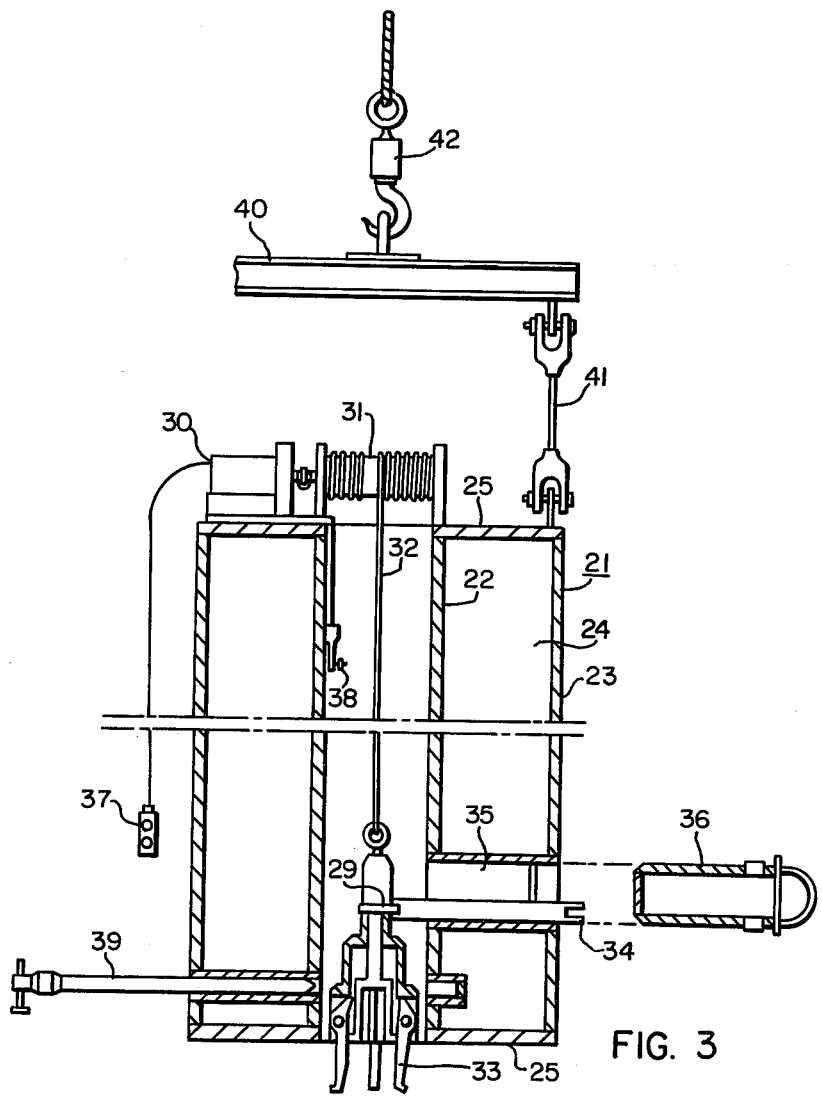
FIG. 3 is a view partially in section of one form of the apparatus as provided by this invention.

Details of one form of the fuel handling arrangement 21 for the transfer of new plutonium recycle fuel assemblies is shown in FIG. 3. An inner sleeve 22 is separated from an outer sleeve 23 by an annulus 24. Each end of annulus 24 is capped by an end plate 25. In a preferred embodiment, sleeves 22 and 23 as well as end caps 25 are made from one-inch stainless steel plate. Annulus 24 is filled with a material such as water, mineral oil, polyethylene or other like radiation shielding material. A preferred size of annulus 24 is such that it comprises a radiation shield equivalent to 6 inches of water. The combination of the sleeves and the annulus will reduce the radiation level from 400 MR/Hr within the interior of sleeve 22 to a level of approximately 2.5 MR/Hr at the outside of sleeve 23. The higher radiation level represents the maximum recycle radiation level of Plutonium 239 which is the material from which the plutonium recycle fuel assemblies are made. The 2.5 MR/Hr radiation level represents an acceptable power limit permitting direct access by reactor site personnel without harm from radiation.

The width of inner sleeve 22 as well as the length of the arrangement 21 is consistent with the maximum length and width of a fuel assembly to be handled by the arrangement. For example, assuming a fuel assembly has a length of 160 inches, and then the length of the handling arrangement 21 should be approximately 180 inches long; and assuming a fuel assembly has a width of 8.5 inches, then the width of inner sleeve 22 should be 12 inches.

An appropriately powered electrical gear motor 30 is connected to a cable winch 31 and is mounted to the end cap 25 such that a cable 32 associated with cable winch 31 is positioned to move within inner sleeve 22. A fuel handling tool 33 is attached to the end of cable 32. Any one of a number of designs of fuel handling tools is satisfactory for use with the arrangement. The type of fuel handling tool 33 shown in FIG. 3 comprises four pivotable latching arms which fit within an opening of a fuel assembly. Although not shown operation of the handling tool 33 is readily envisioned whereby rotation of an actuator 29 causes outward rotation of the latching arms which then lock into position within an opening provided in the fuel assembly. In order to permit insertion of an actuator extension 34, an opening 35 is provided through the lower end of the fuel handling arrangement 21. An access plug 36 is provided for the purpose of sealing hole 35 during such times as when the actuator extension 34 is not being used. Plug 36 is constructed in a manner consistent with the shielding capabilities of the fuel handling arrangement 21. For example, access plug 36 may consist of a steel encasement having a core filled with polyethylene or water or mineral oil.

Raising and lowering of the fuel handling tool 33 is accomplished by means of a pendent control 37 which actuates the gear motor 30 and the cable winch 31 attached thereto. A limit switch 38 which overrides pendant control 37 is provided in the upper end of inner sleeve 22. When a fuel assembly which is being raised comes in contact with limit switch 38, gear motor 30 is automatically stopped to prevent impact of the upper end of the fuel assembly with the cable winch 31. A safety shaft 39 is used to pin a raised fuel assembly to the fuel handling arrangement 21 thereby providing redundant support of the fuel assembly.

The fuel handling arrangement 21 adapted to be suspended from an overhead crane such as crane 15 in FIG. 2. The suspension comprises a Y-shaped spreader 40 and three slings 41 which are capable of pivoting at each end. A load cell 42 is interposed between the crane hook and spreader 40 to indicate whether or not the fuel handling arrangement is being supported by the overhead crane.

In a typical operating sequence of the fuel handling arrangement, fuel handling arrangement 21 is suspended from a crane and positioned directly over a fuel assembly about to be transferred from one location in the fuel handling building 10 to another. The arrangement 21 is lowered to a point where the fuel handling tool 33 is positioned within an opening in the fuel assembly. Access plug 36 is then removed and actuator extension 34 is inserted through the opening 35 and the fuel handling tool 33 is locked into engagement with the fuel assembly. Gear motor 30 is then turned on by pendent control 37 causing rotation of cable winch 31 and lifting of the fuel assembly attached thereto. The fuel assembly is then completely drawn up within the inner sleeve 22 until contact with limit switch 38 is achieved and the gear motor 30 is deactivated. Safety shaft 39 is then slid in place thereby preventing the fuel assembly from being dropped in the unlikely event of failure of either the fuel handling tool 33, the cable 32, or the cable winch 31. The completely shielded fuel assembly may now be transferred within the fuel handling building 10.

It is to be noted that in the transfer of the fuel assembly from a shipping container 12 to the new fuel storage area 14 or from the new fuel storage area 14 to the inspection station 17 and from the inspection station 17 to the refueling canal 18, that the radioactive fuel assembly is being continuously shielded. For example, in FIG. 2 it is seen that as the fuel assembly is lifted out of the shipping container 12 it is being drawn up into the shielded handling arrangement 21. Thus, the invention provides for the dry transfer of a radioactive fuel assembly from one location to another while maintaining a radiation shield which permits direct access thereto by operational personnel.

Since numerous changes may be made in the above described arrangement and different embodiments of the invention may be made without departing from the spirit and scope thereof, it is intended that all the matter contained in the foregoing description or shown in the accompanying drawings shall be interpreted as illustrative and not in a limiting sense.

We claim:

1. Apparatus for handling an elongated radioactive fuel assembly during dry transfer operations comprising means for shielding said fuel assembly during said dry transfer operations, said fuel assembly being positioned within said shielding means during said transfer operations and means mounted on said shielding means for grasping and lifting said fuel assembly longitudinally within and relative to said shielding means, limit switch means located within said shielding means and positioned to engage said fuel assembly when said fuel assembly is entirely within said shielding means, said limit switch means being electrically coupled to said grasping and lifting means for terminating lifting movement of said fuel assembly and means for redundantly supporting a fuel assembly when said fuel assembly is positioned within said shielding means.

2. The apparatus of claim 1, wherein said shielding means comprises an inner substantially cylindrical member, an outer substantially cylindrical member, said annulus containing a material having radiation shielding characteristics.

3. The apparatus of claim 2, wherein said shielding means includes an opening transversely through said inner and outer members and said radiation shielding material therebetween and a plug for sealing said opening, said plug comprising a radiation shield for preventing radiation leakage through said opening.

4. The apparatus of claim 1, wherein said grasping and lifting means includes a motor, a winch mechanically connected to said motor, a cable attached at one end to said winch and a fuel handling tool for grasping a fuel assembly attached to the other end of said cable.

5. The apparatus of claim 4, wherein said fuel handling tool includes a frame and a plurality of hook members pivotally connected to said frame, said hook members serving to engage a fuel assembly upon being pivoted.

6. The apparatus of claim 1, wherein said redundant support comprises a pin member interconnecting said fuel assembly with said shielding means, said pin member being positioned within an opening in said shielding means.

7. The apparatus of claim 1, including means for lifting said apparatus, said lifting means comprising a sling assembly mounted to said shielding means and a load cell attached to said sling assembly for permitting determination of the weight being supported thereby.

* * * * *